United States Patent
Fukumoto et al.

(10) Patent No.: US 7,236,375 B2
(45) Date of Patent: Jun. 26, 2007

(54) DC/AC CONVERTER AND ITS CONTROLLER IC

(75) Inventors: Kenichi Fukumoto, Kyoto (JP); Hiroyuki Fujita, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 525 days.

(21) Appl. No.: 10/501,706

(22) PCT Filed: Aug. 29, 2003

(86) PCT No.: PCT/JP03/11030

§ 371 (c)(1),
(2), (4) Date: Jul. 16, 2004

(87) PCT Pub. No.: WO2004/047279

PCT Pub. Date: Jun. 3, 2004

(65) Prior Publication Data

US 2005/0219863 A1    Oct. 6, 2005

(30) Foreign Application Priority Data

Nov. 15, 2002    (JP) .............................. 2002-331945

(51) Int. Cl.
*H02M 3/00*    (2006.01)
*H02M 7/00*    (2006.01)
*H05B 41/36*    (2006.01)

(52) U.S. Cl. ........................... 363/15; 363/73; 315/291

(58) Field of Classification Search ............ 363/15–16, 363/26, 19, 21.03, 21.07–21, 21.11, 34, 123, 363/40–41, 73, 109; 315/DIG. 2, DIG. 7, 315/224, 244, 279, 291, 307, 239
See application file for complete search history.

(56) References Cited

U.S. PATENT DOCUMENTS

| | | | | |
|---|---|---|---|---|
| 5,444,336 A | * | 8/1995 | Ozawa et al. | 315/307 |
| 6,008,589 A | * | 12/1999 | Deng et al. | 315/209 R |
| 6,075,325 A | * | 6/2000 | Kouno et al. | 315/307 |
| 6,377,480 B1 | * | 4/2002 | Sase et al. | 363/49 |

FOREIGN PATENT DOCUMENTS

| | | |
|---|---|---|
| JP | 56-007493 | 1/1981 |
| JP | 04-190679 | 7/1992 |

* cited by examiner

*Primary Examiner*—Shih-Chao Chen
*Assistant Examiner*—Minh Dieu A
(74) *Attorney, Agent, or Firm*—Hogan & Hartson LLP.

(57) ABSTRACT

An inverter has a semiconductor switch circuit in the primary winding of a transformer such that each of the switches of the switch circuit is controlled by pulse-width modulation (PWM) to supply a constant ac current and a constant ac voltage to a load, such as a cold cathode fluorescent light, connected to a secondary winding of the transformer. A common slow-start control circuit is provided in the inverter circuit to enable a common slow startup of the PWM control of the output voltage and output current. This arrangement suppresses an excessive voltage and an inrushing current during a startup.

9 Claims, 5 Drawing Sheets

TIME

DC/AC CONVERTER AND ITS CONTROLLER IC

TECHNICAL FIELD

This invention relates to a dc-ac converter (hereinafter referred to as inverter) for generating ac power to drive a load, from a dc power supply unit such as a power supply adapter of an electric apparatus and a battery. The invention also relates to a controller IC for use in such inverter.

BACKGROUND OF THE INVENTION

A cold cathode fluorescent light (CCFL) has been increasingly used as a back light source of a liquid crystal display monitor of a notebook PC and of a liquid crystal display (LCD) for use with, for example, a TV set. Such CCFL has substantially the same high efficiency and long life as a usual hot cathode fluorescent light, without using a filament of the hot cathode fluorescent light.

In order to start up and operate the CCFL, a high ac voltage is required. For example, a startup voltage of about 1000 V and an operating voltage of about 600 V are required. These high ac voltages are generated from a dc power supply unit of, for example, a notebook PC and a liquid crystal TV set, using an inverter.

Conventionally, a Royer circuit has been used as an inverter for the CCFL. The Royer circuit comprises a saturable magnetic core transformer and a control transistor, and is adapted to undergo a self-sustaining oscillation owing to the nonlinear permeability of the saturable magnetic core and the nonlinear current gain characteristic of the control transistor. The Royer circuit itself requires no external clock or driver circuit.

However, a Royer circuit is basically a constant-voltage inverter, which cannot maintain a constant output voltage if the input voltage thereto and/or the load current thereof varies. Hence, in order to maintain a constant input voltage to the Royer circuit, a regulator for supplying electric power to the Royer circuit is required. For this reason, the inverter utilizing a Royer circuit cannot be easily miniaturized, and has low power inversion efficiency.

A CCFL inverter having improved power conversion efficiency has been disclosed (see for example Japanese Patent Application H10-50489). This inverter comprises a first semiconductor switch connected in series with the primary winding of a transformer, a serially connected second semiconductor switch and a capacitor which are connected in parallel with the primary winding, and a coupling capacitor and a load connected in series with the secondary winding of the transformer. The first and second semiconductor switches are switched on and off by a control signal received from a control circuit to supply ac power to the load.

A full-bridge (often called H bridge) type CCFL inverter utilizing four semiconductor switches has been proposed (see for example U.S. Pat. No. 6,259,615.) This inverter has a transformer having its primary winding connected to the output end of the full bridge via a resonant capacitor connected in series with the primary winding. The load is connected to the secondary winding of the transformer. Of the four semiconductor switches constituting the full bridge, a first set of two semiconductor switches establishes a current path in a first direction to the primary winding of the transformer and a second set of two semiconductor switches establishes a current path in a second direction to the primary winding. The control circuit provides the full bridge semiconductor switches with control signals each having a fixed pulse width and a controlled relative position of the pulse, thereby regulating the power given to the load. Over-current protection is carried out by detecting the voltage across the secondary winding of the transformer.

Although conventional inverters are designed to drive a load under a constant-current control and protect the load against an excessive voltage, it is often the case that the load, particularly a CCFL in the present example, is subjected to an excessive current and/or excessive voltage during a startup on account of a loop-delay encountered in the constant-current control or an operational delay in protection against an excessive voltage. This excessive current and excessive voltage impose a strong stress on the CCFL, thereby shortening the life of the CCFL. Furthermore, major components of the inverter such as a transformer, a semiconductor switch, and a battery must be constructed to withstand excessive current and excessive voltage.

It is, therefore, an object of the invention to provide an inverter having a semiconductor switch circuit connected to the primary winding of a transformer such that the switches of the semiconductor switch circuit are respectively controlled by pulse-width modulation (PWM) to supply a constant current and a constant voltage to the load, said inverter capable of preventing an excessive inrushing current to the load and an excessive voltage on the load from occurring during a startup, irrespective of a possible loop delay in the constant-current/voltage control loop.

It is another object of the invention to provide a controller IC for use in such inverter.

SUMMARY OF THE INVENTION

An inverter in accordance with one aspect of the invention comprises:
   a dc power supply;
   a transformer having a primary winding and at least one secondary winding;
   a semiconductor switch circuit for passing a current alternately in a first direction and a second direction from the dc power supply to the primary winding;
   a load connected to the secondary winding;
   a current detection circuit for detecting the current flowing through the load to generate a current detection signal indicative of the current detected;
   a voltage detection circuit for detecting the voltage impressed on the load to generate a voltage detection signal indicative of the voltage detected;
   a triangular wave signal generation circuit for generating a triangular wave signal;
   a slow-start circuit for generating a slow-start signal that rises slowly during a startup of the load;
   a PWM control signal generation circuit for generating a PWM control signal, the PWM control signal generation circuit adapted to
      receive the triangular wave signal, current detection signal, voltage detection signal, and slow-start signal;
      generate an error signal based on the current detection signal and voltage detection signal;
      automatically select either one of the error signal and the slow-start signal based on the magnitudes of the signals; and
      compare the selected signal with the triangular wave signal to generate the PWM control signal, and wherein
      the semiconductor switch circuit is switched on and off based on the PWM control signal.

A controller IC for driving a semiconductor switch circuit to control the ac output power thereof to be supplied to a load in accordance with the invention comprises:

a triangular wave signal generation block connected to an external capacitor for oscillation (oscillation capacitor) and a resistor for oscillation (oscillation resistor), for generating a triangular wave signal;

a slow-start block for generating a slow-start signal that rises slowly during a startup of the load when the slow-start block is connected to an external startup capacitor; and a PWM control signal generation circuit for generating a PWM control signal, the PWM control signal generation circuit adapted to receive the triangular wave signal, current detection signal generated signal generated by detecting the current flowing through the load, voltage detection signal by detecting the voltage impressed on the load, and slow-start signal;

generate an error signal based on the current detection signal and voltage detection signal;

automatically select either one of the error signal and the slow start signal based on the magnitudes of the signals; and compare the selected signal with the triangular wave signal to generate the PWM control signal, and wherein the semiconductor switch circuit is switched on and off based on the PWM control signal.

The PWM control signal generation circuit may include an error signal generation circuit for automatically selecting one of a current error signal and a voltage error signal in accordance with the magnitudes of the error signals and for outputting the selected error signal as the error signal, wherein the current error signal is generated based on the difference between the current detection signal and a reference current signal, and the voltage error signal is generated based on the difference between the voltage detection signal and a reference voltage signal; and a PWM signal comparator adapted to receive the triangular wave signal, error signal, and slow-start signal;

select either one of the error signal and the slow-start signal based on the magnitudes thereof; and compare the selected signal with the triangular wave signal to generate the PWM control signal.

The error signal generation circuit may include:

a first error amplifier for generating a first error output upon comparison of the current detection signal with the current reference signal;

a second error amplifier for generating a second error output upon comparison of the voltage detection signal with the reference voltage signal;

a first control element controlled by the first error output; and a second control element controlled by the second error output, wherein the output ends of the first and second control elements are connected with each other to output from the node thereof (referred to as interconnection node) the error signal.

The error signal generation circuit may be configured to have a first and a second feedback capacitors, with the first feedback capacitor connected between the interconnection node and the input end of the first error amplifier receiving the current detection signal, and the second feedback capacitor connected between the interconnection node and the input end of the second error amplifier receiving the voltage detection signal.

In an inverter and a controller therefor for supplying controlled constant voltage and current to a load through PWM control thereof, the invention enables use of a common slow-start circuit in the inverter and the controller IC to suppress an excessive load voltage and an excessive load current during a startup of the load. Thus, the invention facilitates extension of the life of CCFL and relieves stresses on the constituent elements such as a transformer, a semiconductor switch circuit, and batteries.

The first error signal associated with the output current and the second error signal associated with the output voltage are integrated into a common error signal. The feedback loops, which feed back the common error signal as a feedback voltage, may be unified. Particularly, when the controller IC utilizes external feedback elements, feedback terminals for the external elements can be reduced in number.

The slow-start circuit may be adapted to cooperate with an external capacitor, external to the IC, for generating a slow-start voltage, so that the rising time of the slow-start circuit can be properly optimized by adjusting the capacitance of the external capacitor in accordance with the characteristics of the load.

BEST MODE FOR CARRYING OUT THE INVENTION

The invention will now be described in detail by way of example with reference to the accompanying drawings illustrating an inverter for generating an ac voltage to drive a load from a dc power supply, and a controller IC therefor.

Figure 1:
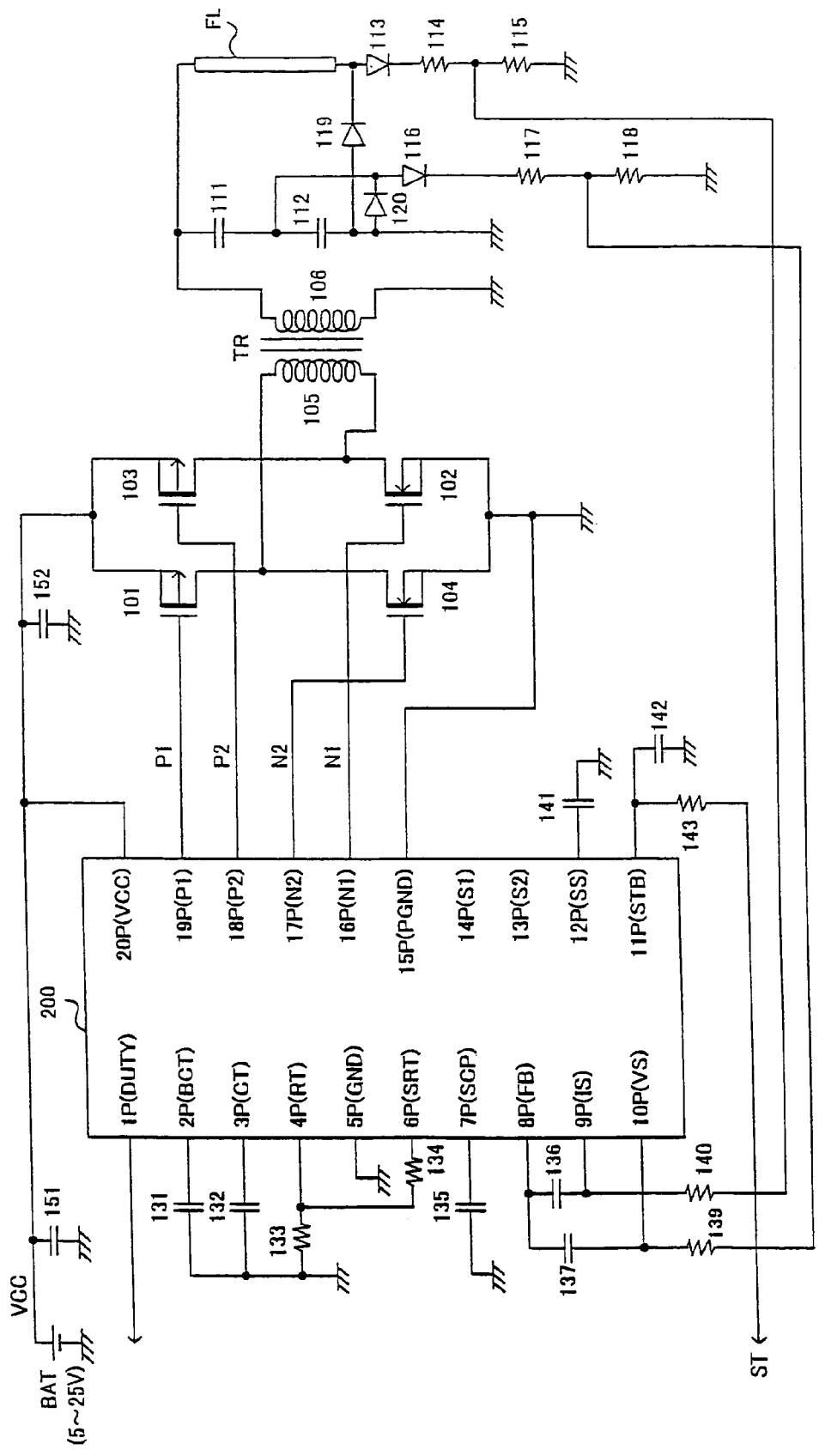
FIG. 1 is a schematic diagram showing an over-all arrangement of an inverter in accordance with an embodiment of the invention.
Figure 2:
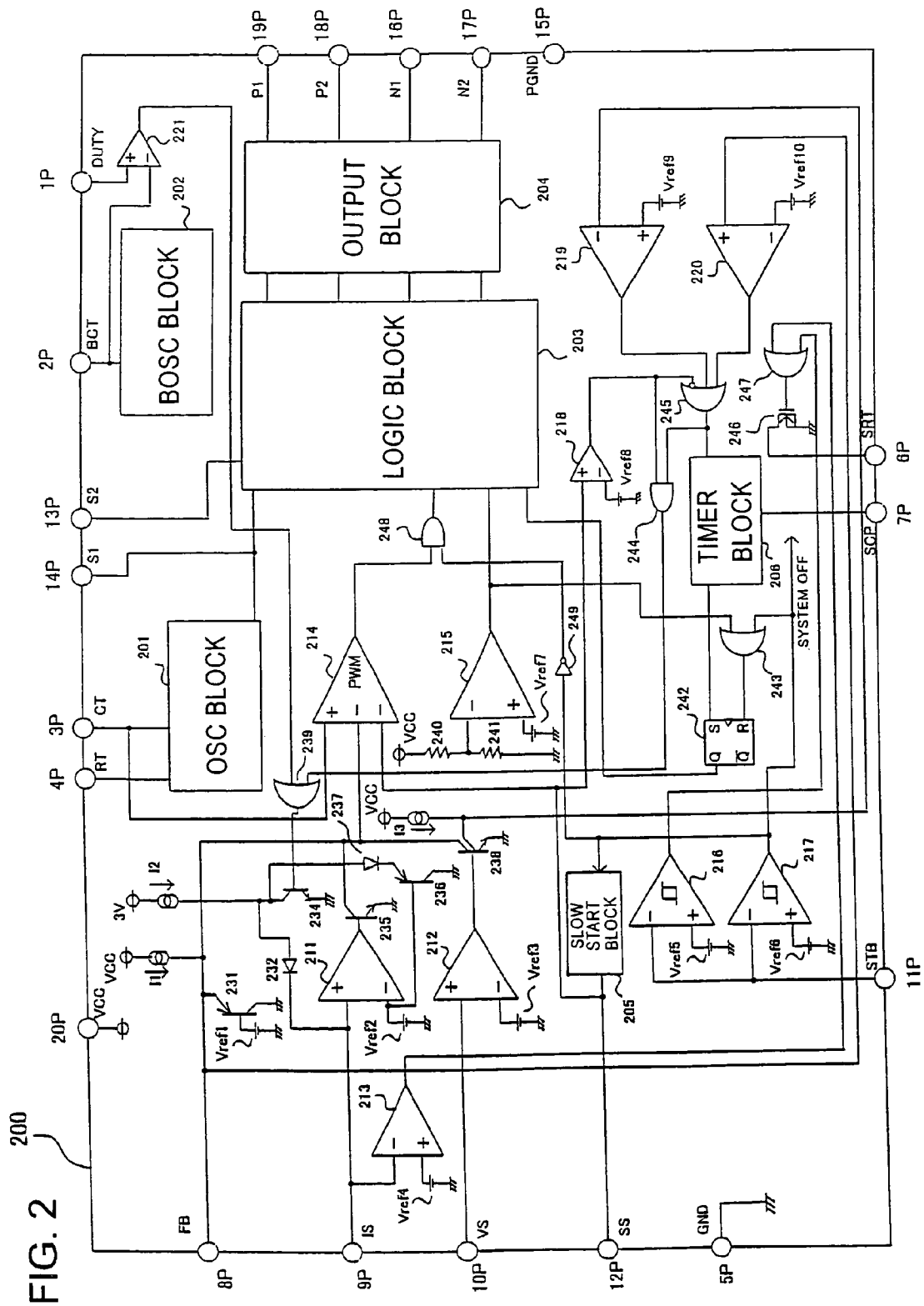
FIG. 2 is a schematic diagram showing an internal structure of a controller IC for use in the inverter of FIG. 1.

Referring to FIG. 1, there is shown an over-all arrangement of an inverter according to the invention that utilizes an insulated transformer and a full-bridge switch circuit for carrying out PWM control. FIG. 2 illustrates the internal structure of a controller IC (i.e. IC for controlling inverter) for use in the inverter of FIG. 1.

As shown in FIG. 1, a first switch in the form of a P-type MOSFET (hereinafter referred to as PMOS) 101 and a second switch in the form of an N-type MOSFET (hereinafter referred to as NMOS) 102 constitute a first current path in a first direction from a dc power supply to the primary winding 105 of a transformer TR. A third switch in the form of a PMOS 103 and a fourth switch in the form of NMOS 104 constitute a second current path in a second direction from the dc power supply to the primary winding 105 of the transformer TR. Each of the PMOSs 101 and 103 and NMOSs 102 and 104 has a body diode (that is, a back gate diode). With these body diodes, a current can be passed in the direction opposite to the forward direction of the current. Additional diodes may be provided to provide the same function as the body diodes.

The primary winding 105 of a transformer TR is supplied with a power supply voltage VCC from a dc power supply BAT through PMOSs 101 and 103 and NMOSs 102 and 104 to induce a high voltage across a secondary winding 106 of the transformer TR in accordance with the winding ratio of the primary to the secondary windings. The induced high voltage is supplied to a cold cathode fluorescent light FL to turn it on.

Capacitors 111–112 and resistors 117–118 are provided to detect the voltage impressed on the cold cathode fluorescent light FL and feed the detected voltage back to a controller IC 200. Resistors 114–115 are provided to detect the current that flows through the cold cathode fluorescent light FL and feed it back to the controller IC 200. The capacitor 111 is adapted to resonate with the inductance of the transformer TR. The parasitic capacitance of the cold cathode fluorescent light FL also contributes to the resonance. Elements numbered 113, 116, 119, and 120 are diodes. Elements numbered 151 and 152 are capacitors provided to stabilize the power supply voltage.

The controller IC 200 has a multiplicity of input/output (I/O) pins. A first pin 1P is a mode switching terminal for switching the operation mode of the inverter between PWM mode and intermittent operation mode (hereinafter referred to as burst mode). The first pin 1P is supplied with a duty signal DUTY for switching the operation mode and for determining the duty cycle ratio during the burst mode.

A second pin 2P is a terminal (capacitive connection terminal) for connection with the capacitor 131 of a burst mode oscillator (BOSC). The second pin 2P is connected to the capacitor 131 to generate across the capacitor a triangular wave signal (i.e. triangular wave signal train) BCT for initiating a burst. The triangular wave signal will hereinafter be referred to as burst triangular wave signal.

A third pin 3P is a terminal for connection with a capacitor 132 to establish an oscillation frequency of a PWM mode oscillator (OSC). A triangular wave signal (i.e. triangular wave signal train) CT for PWM (referred to as triangular PWM signal) is generated at the third pin 3P connected to the capacitor 132. A fourth pin 4P is a terminal for connection with a resistor 133 for setting up a charge current to the third pin 3P. The fourth pin 4P has a potential RT, which causes a current to flow through the resistor 133 connected thereto in accord with the potential RT and the resistance of the resistor 133. A fifth pin 5P is an earth terminal having ground potential GND.

A sixth pin 6P is a terminal (referred to as charge current setting resistor terminal) for connection with a resistor (referred to as charge current setting resistor) 134 to set up a charge current to the capacitor 132 connected to the third pin 3P. The charge current setting resistor 134 connected to the sixth pin 6P is connected in parallel with the resistor 133 or disconnected therefrom, under the control of an internal circuit of the controller IC 200. The sixth pin 6P has a potential SRT, which equals either the ground potential GND or the potential RT of the fourth pin 4P. A seventh pin 7P is a terminal for connection with a capacitor 135 for setting a timer latch. The capacitor 135 when connected to the seventh pin 7P stores a charge, developing a voltage SCP in accord with the charge. The capacitor 135 determines the time limit of protective action to protect the internal circuit of the controller IC 200.

A ninth pin 9P is an input terminal of a first error amplifier. The ninth pin 9P is fed, via a resistor 140, a current detection signal (referred to as detection current) IS in accord with the current flowing through the cold cathode fluorescent light FL. The detection current IS is inputted into the first error amplifier. An eighth pin 8P is an output terminal of the first error amplifier. Connected between the eighth pin 8P and the ninth pin 9P is a capacitor 136. The potential of the eighth pin 8P serves as feedback control voltage FB for the PWM control. In what follows the ground potential is taken as a reference for voltages unless otherwise stated.

A tenth pin 10P is an input terminal of a second error amplifier. The tenth pin 10P is fed via a resistor 139 a voltage detection signal (hereinafter referred to as detection voltage) VS in accord with the voltage impressed on the cold cathode fluorescent light FL. The detection voltage VS is inputted into the second error amplifier. Connected between the tenth pin 10P and the eighth pin 8P is a capacitor 137.

An eleventh pin 11P is a terminal for setting starting time and for starting up the inverter. A signal STB is derived from a delayed startup signal ST by removing the noise therefrom by means of a resistor 143 and a capacitor 142, and is supplied to an eleventh pin 11P. A twelfth pin 12P is a terminal for connection with a grounded capacitor 141 for setting slow-start time. A slow-start voltage SS gradually develops across the capacitor 141 at the time of a startup.

A thirteenth pin 13P is a synchronization terminal to be connected to another controller IC when the controller 200 is to be synchronized therewith. A fourteenth pin 14P is an I/O terminal of the internal clock, for connection with another controller IC when the controller 200 is to collaborate with said another controller.

A fifteenth pin 15P is an earth terminal for an external FET drive circuit. A sixteenth pin 16P is a terminal for outputting a gate drive signal N1 of the NMOS 102. A seventeenth pin 17P is a terminal for outputting a gate drive signal N2 of the NMOS 104. An eighteenth pin 18P is a terminal for outputting a gate drive signal P2 of the PMOS 103. A nineteenth pin 19P is a terminal for outputting a gate drive signal P1 of the PMOS 101. A twentieth pin 20P is a power supply terminal for receiving the power supply voltage VCC.

As shown in FIG. 2 illustrating the internal structure of the controller IC 200, an oscillation (OSC) block 201 generates a PWM triangular wave signal CT having a period of cycle determined by the capacitor 132 connected to the third pin 3P and the resistors 133–134 connected to the fourth pin 4P, and supplies the signal CT to a PWM comparator 214. The OSC block 201 also generates an internal clock and supplies it to a logic block 203.

A BOSC block 202 is an oscillation circuit (hereinafter referred to as burst triangular wave signal generation circuit) for generating a burst triangular wave signal BCT having a frequency determined by the capacitor 131 connected to the second pin 2P. The frequency of the burst triangular wave signal BCT is set much lower than the frequency of the PWM triangular wave signal CT (i.e., BCT frequency<CT frequency). The dc voltage supplied to the first pin 1P (that is, analogue duty signal DUTY) and the burst triangular wave signal BCT are compared in a comparator 221. The output of the comparator 221 is used to drive an NPN transistor (hereinafter referred to as NPN) 234 via an OR circuit 239. In a case where a digital (PWM) duty signal DUTY is supplied to the first pin 1P, a resistor is connected to the second pin 2P to output a predetermined burst voltage from the BOSC block 202.

The logic block 203 is supplied with a PWM control signal, for example, to generate a switch drive signal in accord with a predetermined logic. An output block 204 generates gate drive signals P1, P2, N1, and N2, in accord with the switch drive signal received from the logic block 203, and supplies them to the respective gates of the PMOSs 101 and 103 and NMOSs 102 and 104.

A slow-start block 205 is supplied with the start up signal ST and is started up by the output of a comparator 217 when the slowly rising voltage STB raised by the capacitor 142 and resistor 143 and input to the comparator 217 exceeds a reference voltage Vref6. The output of the comparator 217 enables the logic block 203. A circuit 249 is an inversion circuit. The output of the comparator 217 resets a flip-flop (FF) circuit 242 via an OR circuit 243. As the start block 205 is started up, the slow-start voltage SS gradually rises, which is inputted to the PWM comparator 214 as a comparison input. Thus, during a startup, PWM control is controlled by the slow-start voltage SS.

It is noted that during a startup, the comparator 216 turns off an NMOS 246 via an OR circuit 247 when the input to the comparator 216 exceeds a reference voltage Vref5. This causes the resistor 134 to be separated from the controller IC 200 and the frequency of the PWM triangular wave signal CT to be changed. The OR circuit 247 is also fed the output of a comparator 213.

A first error amplifier 211 compares the detection current IS that is proportional to the current flowing through the cold cathode fluorescent light FL with a reference voltage Vref2 (which is, for example, 1.25 V), and generates an output in accord with the error between them to control an NPN 235 connected to a constant-current source I1. The collector of the NPN 235 is connected to the eighth pin 8P. Thus, the potential of the node (i.e. the eighth pin 8 P) serves as the feedback voltage FB to be inputted to the PWM comparator 214 as a comparison input.

The PWM comparator 214 compares the triangular wave signal CT with the lower one of the feedback voltage FB and the slow-start voltage SS to generate and provide PWM control signals to the logic block 203 via an AND circuit 248. Under a steady state condition reached subsequent to a startup, the triangular wave signal CT is compared with the feedback voltage FB for automated control of the current flowing through the cold cathode fluorescent light FL at a preset level.

Because the capacitor 136 is connected between the eighth pin 8P and the ninth pin 9P, the feedback voltage FB increases and decreases smoothly. As a consequence, the PWM control is carried out smoothly, without an abrupt change.

A second error amplifier 212 compares the detection voltage VS that is proportional to the voltage across the cold cathode fluorescent light FL with a reference voltage Vref3 (which is 1.25 V, for example) to generate an output voltage indicative of the difference between them. This output is used to control a double-collector type NPN 238 having one collector connected to the constant-current source I1. Since the collector of the NPN 238 is also connected to the pin 8P, the feedback voltage FB is also controlled by the detection voltage VS. That is, the comparator 212 and the NPN 238 together constitute a feedback signal control circuit for controlling the feedback signal FB.

Incidentally, if the feedback voltage FB exceeds a reference voltage Vref1 (e.g. 3 V), a PNP transistor (hereinafter referred to as PNP) 231 will be turned on to limit excessive rise of the feedback voltage FB.

A comparator 215 compares the voltage generated by dividing the power supply voltage VCC by resistors 240 and 241 with a reference voltage Vref7 (e.g. 2.2 V), and, when the power supply voltage VCC reaches a predetermined level, inverts its output to reset the FF circuit 242 via the OR circuit 243.

A comparator 218 compares the slow-start voltage SS with a reference voltage Vref8 (e.g. 2.2 V) to turn on the NPN 234 via an AND circuit 244 and an OR circuit 239 when the voltage SS exceeds the reference voltage Vref8. The NPN 234, when turned on, causes a diode 232 to be reversely biased by a current source I2 and hence enables the first error amplifier 211 to perform its normal operation. Thus, the NPN 234, diode 232, and the current source I2 constitute a control mode switching circuit for switching the control mode between burst control mode and pulse width control mode.

When the NPN 238 having the other one of the double collectors connected to a constant-current source I3 is turned ON by the second error amplifier 212, its collector voltage lowers below a reference voltage Vref9 (e.g. 3 V). This causes the output voltage of a comparator 219 to be reversed. A comparator 220 compares the feedback voltage FB with a reference voltage Vref10 (e.g. 3 V), and inverts its output voltage when the feedback voltage FB exceeds the reference voltage. The outputs of the comparators 219 and 220 are inputted, along with the inverted output of the comparator 218, to a timer block 206 via an OR circuit 245. The timer outputs the inverted signal after a predetermined time later. The output of this timer block 206 is supplied to the FF 242 to reset it, the Q output of which in turn disables the logic block 203.

Figure 3:
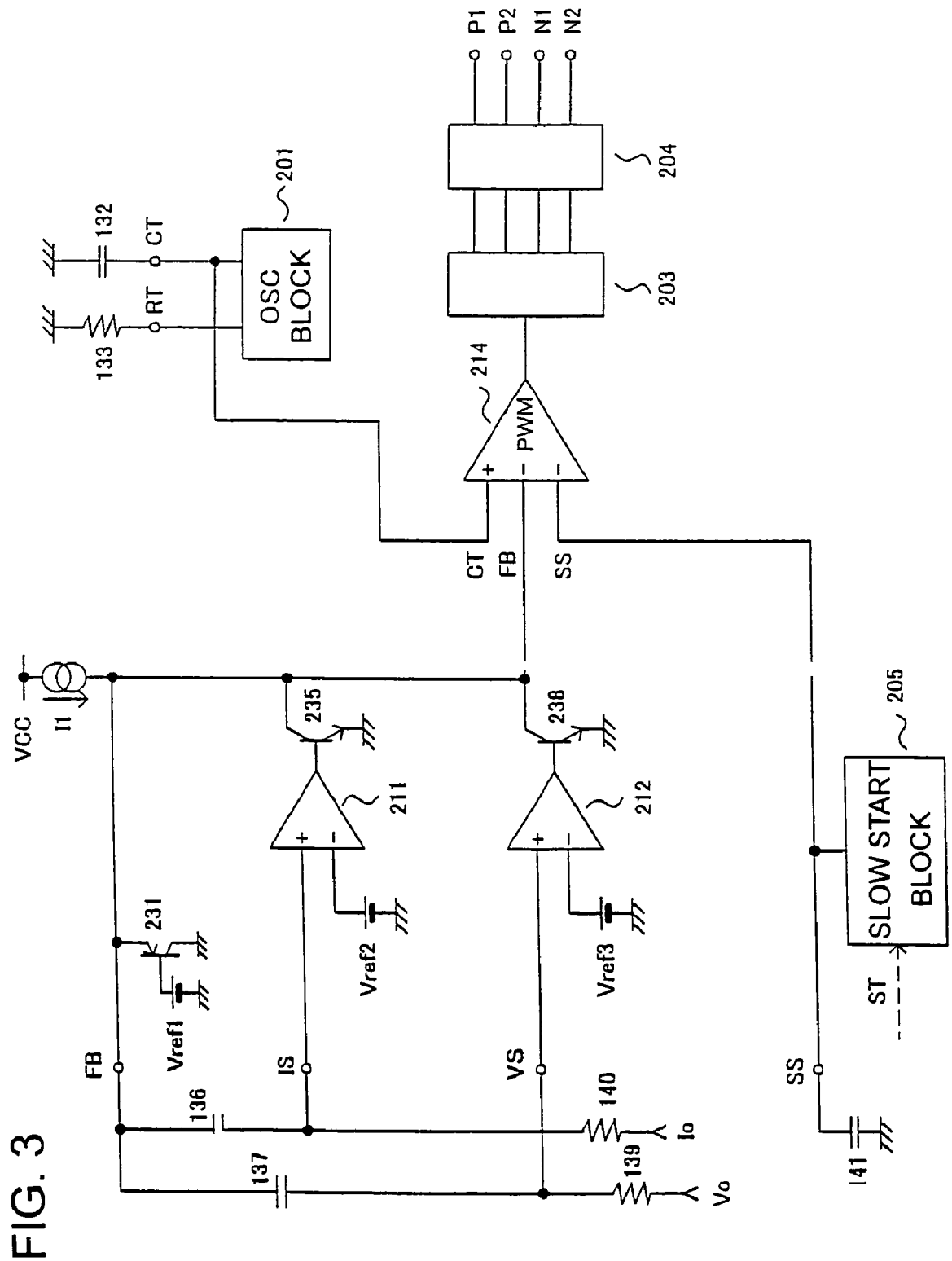
FIG. 3 is a circuit diagram useful in describing slow start of a load during its startup.
Figure 4:
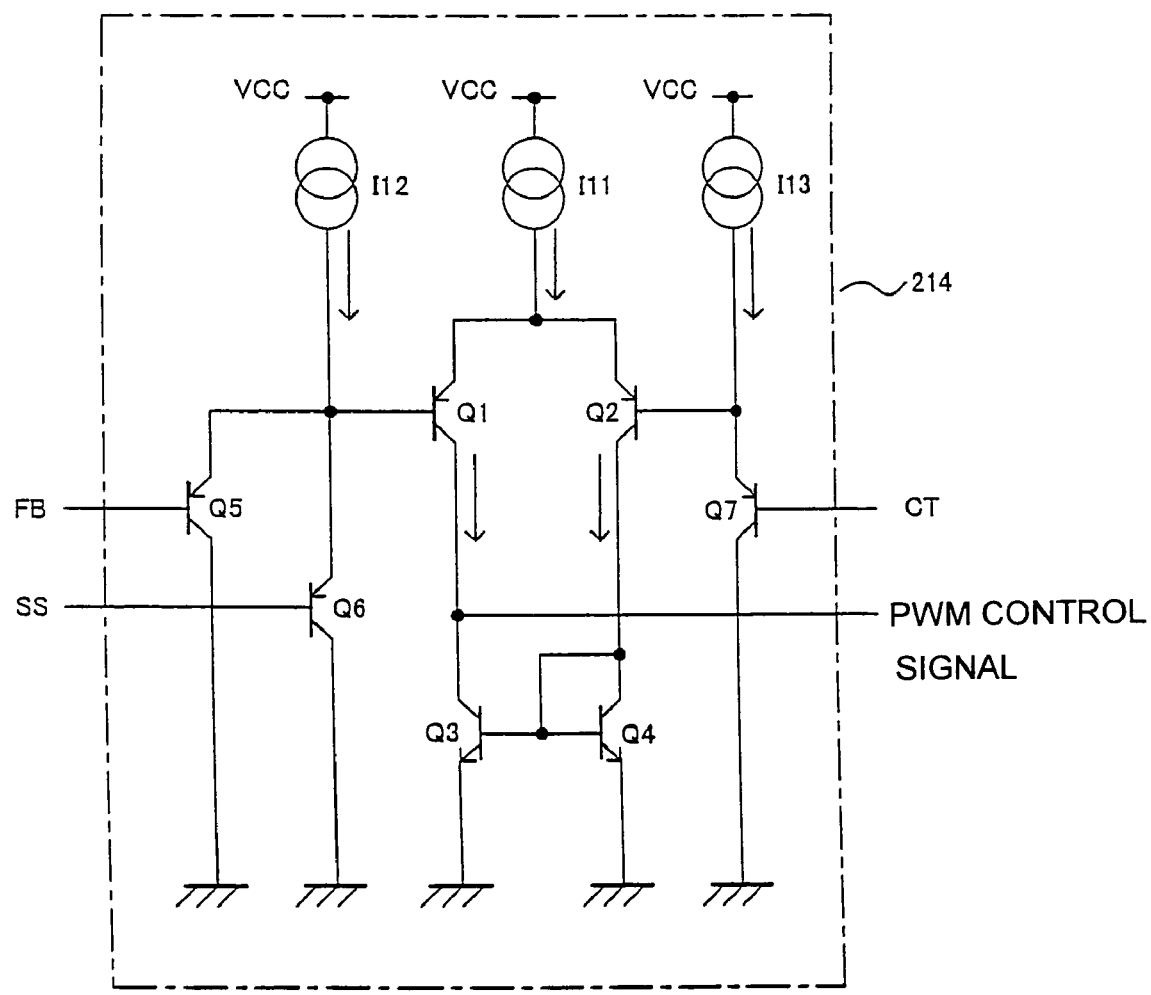
FIG. 4 is a circuit diagram showing an internal structure of the PWM comparator 214.
Figure 5:
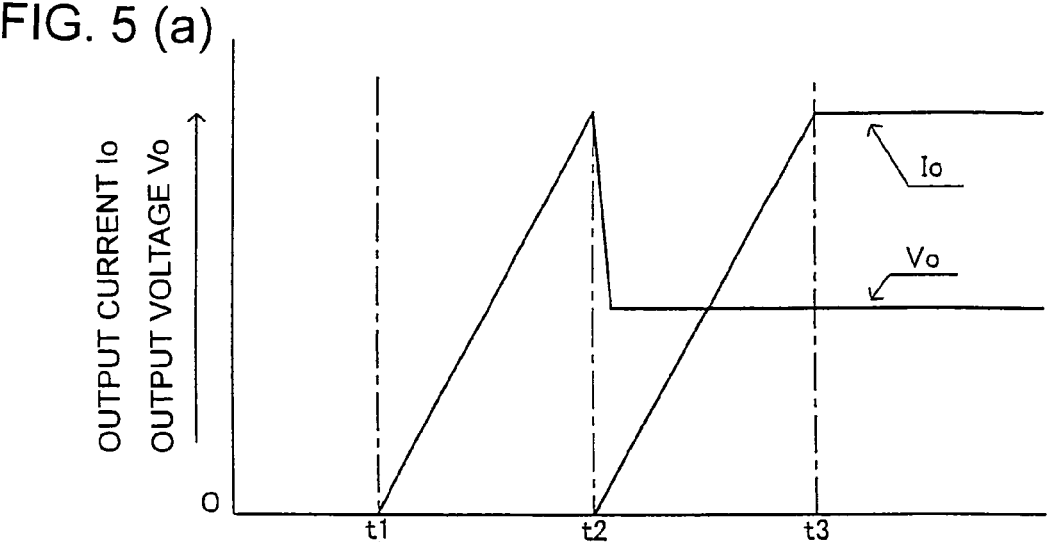
FIG. 5 is a diagram useful in describing the operation of the slow-start circuit during a startup.
Figure 5:
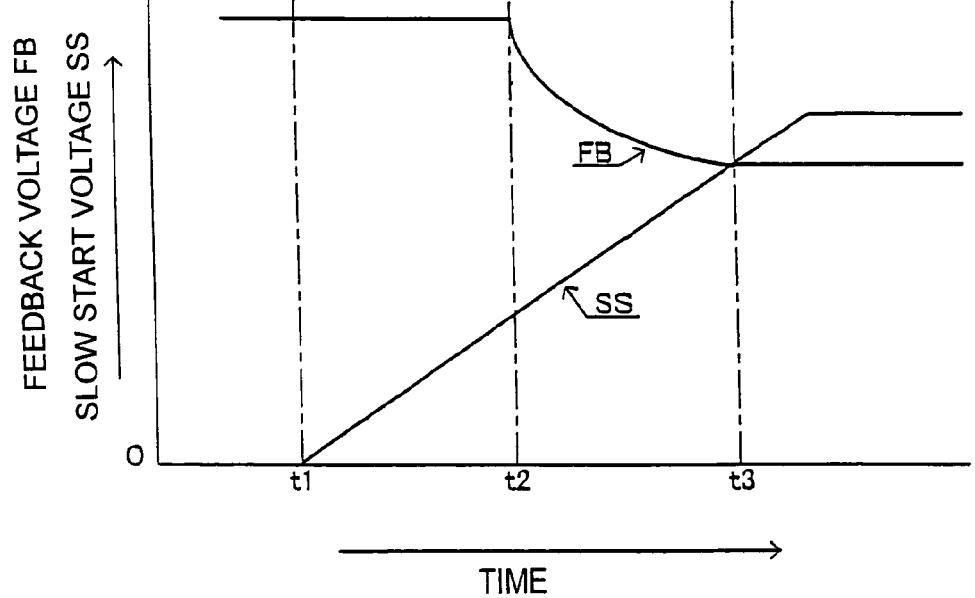

Referring to FIGS. 3–5, operation of the inverter, particularly its operation during a startup, will now be described in detail. FIG. 3 shows a portion of the circuit of FIGS. 1 and 2 that takes part in slow-start during a startup. FIG. 4 shows the internal circuit structure of the PWM comparator 214. FIG. 5 is a diagram illustrating characteristic slow-start operation of the inverter.

As shown in FIG. 4, the PWM comparator 214 includes PNPs Q1 and Q2 for differential operation of a constant-current source I11 and NPNs Q3 and Q4 that are serially connected with the respective PNPs Q1 and Q2. The bases of these NPNs Q3 and Q4 are connected together, and the base and the collector of the NPN Q4 are connected together to form a current mirror configuration. A set of parallelly connected PNPs Q5 and Q6 is serially connected to the current source I12, with the node of the serial PNPs and the current source I12 connected to the base of the PNP Q1. Another PNP Q7 is connected to a current source I13, with the node of the PNP Q7 and the current source I13 connected to the base of PNP Q2.

The feedback voltage FB is supplied to the base of the PNP Q5, the slow-start voltage SS to the base of the PNP Q6, and the triangular wave signal CT to the base of the PNP Q7. The PWM control signal is taken out from the node of the PNP Q1 and NPN Q3. Thus, the lower one of the slow-start voltage SS and the feedback voltage FB is compared with the triangular wave signal CT. The PWM control signal is obtained as a result of this comparison.

The controller IC 200 is supplied with the power supply voltage VCC. The OSC block 201, the capacitor 132, and the resistor 133 together constitute a triangular wave signal generation circuit, which generates a triangular wave signal CT having a frequency determined by the capacitance of the capacitor 132 and the resistance of the resistor 133. This triangular wave signal CT is inputted into (+)-input terminal of the PWM comparator 214.

The feedback voltage FB is supplied to one of the two (−)-input terminals of the PWM comparator 214. Thanks to a common circuit consisting of the constant current source I1 and the NPNs 235 and 238 and supplied with the power supply voltage VCC, the feedback voltage FB rises to a high level (upper limit of the feedback voltage) when the power supply voltage VCC is supplied to the PWM comparator 214. The feedback voltage FB is constrained to a constant level by the PNP 231 and the reference voltage Vref1.

However, the slow-start voltage SS inputted into another (−)-input terminal of the PWM comparator 214 remains zero, since it receives no startup signal ST. At this stage, no PWM control signal is outputted yet, since the PWM comparator 214 prioritize a lower input signal of the feedback voltage FB and the slow-start voltage SS.

As shown in FIG. 5, a startup signal ST is externally supplied to the slow-start circuit represented by the start block 205 at time t1. The startup signal ST causes the constant-current source inside the start block 205 to be activated, thereby causing a constant current to flow into the capacitor 141. Since the capacitor 141 is charged by the constant current, the slow-start voltage SS rises linearly with a predetermined slope. That is, a slow start is initiated.

The slowly rising slow-start voltage SS is compared with the triangular wave signal CT in the PWM comparator 214, whereby a PWM control signal is outputted from the PWM comparator 214 in accord with the magnitude of the slow-start voltage SS. This PWM control signal is supplied to the MOSFETs 101–104 via the logic block 203 and the output block 204, enabling the operation of the inverter.

Since the cold cathode fluorescent light FL connected to the inverter as a load will not be turned on until the voltage across the cold cathode fluorescent light FL reaches a predetermined magnitude, the output voltage Vo rises with the slow-start voltage SS in an early stage of the slow startup. Therefore, unlike conventional inverters, the inventive inverter will not initially impress on the cold cathode fluorescent light FL an excessive output voltage Vo (as high as 2000–2500 V, for example) due to the initial feedback voltage FB at its upper limit. Moreover, since there is no inrushing current that accompanies such excessive output voltage Vo, the cold cathode fluorescent light FL and the major circuit components (e.g. MOSFETs 101–104, transformer TR, battery BAT, etc.) of the inverter are greatly relieved of damage and stress arising from excessive voltages.

The output current Io of the inverter is detected and the detection current IS associated with the detected current is inputted into the first error amplifier 211. The first error amplifier 211 compares the voltage indicative of the detection current IS with the reference voltage Vref2 to generate an output indicative of the comparison for controlling the NPN 235. The output voltage Vo is also detected and the detection voltage VS associated therewith is inputted into the second error amplifier 212. The second error amplifier 212 compares the detection voltage VS with the reference voltage Vref3 to generate an output (referred to as comparison output) to control the NPN 238. As the NPN 235 or NPN 238 is controlled by the detection current IS or the detection voltage VS, the feedback voltage FB begins to fall from the maximum upper level.

The output voltage Vo will rise and reach a predetermined startup voltage (about 1000 V) at time t2. When the output voltage Vo reaches the startup voltage, the output current Io begins to flow, turning on the cold cathode fluorescent light FL. Then the output voltage Vo begins to fall, eventually to the normal operating voltage (about 600 V). No excessive inrushing current will flow even at time t2, either.

After time t2, the output current Io gradually grows up, while the output voltage Vo remains at substantially the constant operating voltage. As the output current Io grows larger and the NPN 235 is controlled, the feedback voltage FB is gradually lowered from the maximum upper level by the feedback action of the capacitor 136. Although the feedback voltage FB is shown to start decreasing at time t2 in FIG. 5, it is shown as illustrative and not in a limiting sense. In the example shown in FIG. 5, the NPN 238 is not controlled yet, since the detection voltage VS has not reached the reference voltage Vref3.

The output current Io increases with the slow-start voltage SS, while the feedback voltage FB decreases. At time t3, when the feedback voltage FB becomes equal to the slow-start voltage SS, the PWM comparator 214 begins to compare the triangular wave signal CT with the feedback voltage FB in place of the slow-start voltage SS that has been so far compared with the triangular wave signal CT. This completes the slow start.

At time t3, the output current Io is controlled to remain at a predetermined constant level determined by the reference voltage Vref2. The luminance of the cold cathode fluorescent light FL is determined by the magnitude of the current that flows through it. Hence, in order to maintain this current, a substantially constant operating voltage must be applied to the cold cathode fluorescent light FL. Therefore, in order to turn on the cold cathode fluorescent light FL, the output voltage Vo is brought to a high level during a startup, but it can be lowered to a low operating voltage once the fluorescent light FL is turned on. Hence, the level of the feedback voltage FB in a steady state (i.e. when the fluorescent light FL is turned on) is determined based on the magnitude of the output current Io.

Incidentally, the start block 205 is provided with a discharge circuit for discharging the charge stored in the capacitor 141 in preparation for the next startup following a shutdown of the inverter. The discharge of the capacitor 141 may be executed by the startup signal ST.

Thus, during a startup, by allowing a slow start to be executed in common for the output voltage Vo and the output current Io supplied to a load under PWM control, an abnormally excessive voltage and an excessive inrushing current can be prevented from occurring in the cold cathode fluorescent light FL.

It should be understood that the outputs of the first error amplifier 211 and of the second error amplifier 212 may be directly inputted to the PWM comparator 214 without passing through the NPN 235 and NPN 238 serving together as a common circuit. This can be done by:

providing the PWM comparator 214 with three (−)-input terminals;

inverting the polarities of the inverting (−)-input terminals and non-inverting (+)-terminals of the first and second error amplifiers 211 and 212;

providing separate feedback loops to the respective capacitors 136 and 137, and inputting the triangular wave signal CT into the (+)-input terminal of the PWM comparator 214, and inputting the outputs of the first and second error amplifiers 212, along with the slow-start signal SS, into the three (−)-input terminals.

INDUSTRIAL APPLICABILITY

As described above, a dc-ac converter and a controller IC therefor of the invention are suitable for use as a backlight power supply for a liquid crystal display that requires a high ac voltage derived from a low-voltage dc power supply.

The invention claimed is:

1. A dc-ac converter, comprising:
   a dc power supply;
   a transformer having a primary winding and at least one secondary winding;
   a semiconductor switch circuit for passing a current alternately in a first direction and a second direction from said dc power supply to said primary winding;
   a load connected to said secondary winding;
   a current detection circuit for detecting the current flowing through said load to generate a current detection signal indicative of the current detected;
   a voltage detector circuit for detecting the voltage impressed on said load to generate a voltage detection signal indicative of the voltage detected;
   a triangular wave signal generation circuit for generating a triangular wave signal;
   a slow-start circuit for generating a slow-start signal that rises slowly during a startup of said load;
   a PWM control signal generation circuit for generating a PWM control signal, said PWM control signal generation circuit adapted to
      receive said triangular wave signal, current detection signal, voltage detection signal, and slow-start signal;
      generate an error signal based on said current detection signal and voltage detection signal;
      automatically select either one of said error signal and said slow-start signal based on the magnitudes of said signals; and
      compare the selected signal with said triangular wave signal to generate said PWM control signal, and wherein
   said semiconductor switch circuit is switched on and off-based on said PWM control signal.

2. The dc-ac converter according to claim 1, wherein said PWM control signal generation circuit includes:
   an error signal generation circuit for automatically selecting one of a current error signal and a voltage error signal in accordance with the magnitudes of said error signals and for outputting the selected error signal as said error signal, wherein
      said current error signal is generated based on the difference between said current detection signal and a reference current signal, and
      said voltage error signal is generated based on the difference between said voltage detection signal and a reference voltage signal; and
   a PWM signal comparator adapted to
      receive said triangular wave signal, error signal, and slow-start signal;
      select either one of said error signal and said slow-start signal based on the magnitudes thereof; and
      compare said selected signal with said triangular wave signal to generate said PWM control signal.

3. The dc-ac converter according to claim 2, wherein said error signal generation circuit includes:
   a first error amplifier for generating a first error output upon comparison of said current detection signal with said reference current signal;
   a second error amplifier for generating a second error output upon comparison of said voltage detection signal with said reference voltage signal;
   a first control element controlled by said first error output; and
   a second control element controlled by said second error output, wherein
   the output ends of said first and second control elements are connected with each other to output said error signals from the node of said output ends.

4. The dc-ac converter according to claim 3, wherein said error signal generation circuit includes a first and a second feedback capacitors, with said first feedback capacitor connected between said node and the input end of said first error amplifier receiving said current detection signal, and said second feedback capacitor connected between said node and the input end of said second error amplifier receiving said voltage detection signal.

5. The dc-ac converter according to claim 1, wherein said load is a cold cathode fluorescent light.

6. A controller IC for driving a semiconductor switch circuit to control the ac output power thereof to be supplied to a load, comprising:
   a triangular wave signal generation block connected to an external oscillation capacitor and an external oscillation resistor, for generating a triangular wave signal;
   a slow-start block connected to an external startup capacitor, for generating a slow-start signal that rises slowly during a startup of said load; and
   a PWM control signal generation circuit for generating a PWM control signal, said PWM control signal generation circuit adapted to
      receive said triangular wave signal, current detection signal generated by detecting the current flowing through the load, voltage detection signal generated by detecting the voltage impressed on the load, and slow-start signal;
      generate an error signal based on said current detection signal and voltage detection signal;
      automatically select either one of said error signal and said slow start signal based on the magnitudes of said signals; and
      compare the selected signal with said triangular wave signal to generate said PWM control signal, and wherein
   said semiconductor switch circuit is switched on and off based on said PWM control signal.

7. The controller IC according to claim 6, wherein said PWM control signal generation circuit includes:
   an error signal generation circuit for automatically selecting one of a current error signal and a voltage error signal in accordance with the magnitudes of said error signals and for outputting the selected error signal as said error signal, wherein
      said current error signal is generated based on the difference between said current detection signal and a reference current signal, and
      said voltage error signal is generated based on the difference between said voltage detection signal and a reference voltage signal; and
   a PWM signal comparator adapted to
      receive said triangular wave signal, error signal, and slow-start signal;
      select either one of said error signal and said slow-start signal based on the magnitudes thereof; and
      compare said selected signal with said triangular wave signal to generate said PWM control signal.

8. The controller IC according to claim 7, wherein said error signal generation circuit includes:
   a first error amplifier for generating a first error output upon comparison of said current detection signal with said reference current signal;

a second error amplifier for generating a second error output upon comparison of said voltage detection signal with said reference voltage signal;

a first control element controlled by said first error output; and a second control element controlled by said second error output, wherein the output ends of said first and second control elements are connected with each other to output said error signal from the node of said output ends.

9. The controller IC according to claim 8, wherein said error signal generation circuit includes a first and a second feedback capacitors, with said first feedback capacitor connected between said node and the input end of said first error amplifier receiving said current detection signal, and said second feedback capacitor connected between said node and the input end of said second error amplifier receiving said voltage detection signal.

* * * * *